(12) United States Patent
Royalty et al.

(10) Patent No.: US 8,840,451 B2
(45) Date of Patent: Sep. 23, 2014

(54) CABIN PRESSURE OUTFLOW VALVE WITH SIMPLIFIED WHISTLE ELIMINATOR

(75) Inventors: Chuck Royalty, Tempe, AZ (US); Kevin Allan Kingsley Jones, Laveen, AZ (US); Ralph Warren Leclercq, Palos Verdes Peninsula, CA (US); Justin A. Tanner, Queen Creek, AZ (US); Laura Tanner, legal representative, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 275 days.

(21) Appl. No.: 13/357,105

(22) Filed: Jan. 24, 2012

(65) Prior Publication Data

US 2013/0186497 A1 Jul. 25, 2013

(51) Int. Cl.
*F15C 1/16* (2006.01)

(52) U.S. Cl.
USPC .......... 454/74; 137/809; 244/1 N; 244/129.5; 244/130

(58) Field of Classification Search
USPC .......... 137/809; 454/71, 74, 75, 76; 244/1 N, 244/129.1, 129.4, 129.5, 130
See application file for complete search history.

(56) References Cited

U.S. PATENT DOCUMENTS

| 3,740,006 | A |   | 6/1973  | Maher |             |
|-----------|---|---|---------|-------|-------------|
| 3,779,338 | A | * | 12/1973 | Hayden et al. | 181/296 |
| 4,217,756 | A | * | 8/1980  | Laskody | 60/262 |
| 5,074,376 | A | * | 12/1991 | Powell | 181/277 |
| 5,088,665 | A | * | 2/1992  | Vijgen et al. | 244/200 |
| 5,533,865 | A | * | 7/1996  | Dassen et al. | 416/228 |
| 5,881,995 | A |   | 3/1999  | Tse et al. |   |
| 6,116,541 | A |   | 9/2000  | Chuang et al. |   |
| 6,471,157 | B1 | * | 10/2002 | Streett et al. | 244/1 N |
| 6,491,260 | B2 | * | 12/2002 | Borchers et al. | 244/199.1 |
| 6,935,098 | B2 | * | 8/2005  | Bardagi et al. | 60/262 |
| 7,185,853 | B2 | * | 3/2007  | Kelnhofer et al. | 244/129.5 |
| 7,198,062 | B2 |   | 4/2007  | Hoffman et al. |   |
| 7,520,803 | B2 |   | 4/2009  | Ito et al. |   |
| 7,815,163 | B2 |   | 10/2010 | Siame et al. |   |
| 7,854,123 | B2 | * | 12/2010 | Au et al. | 60/770 |
| 7,909,576 | B1 | * | 3/2011  | van der Bos et al. | 416/146 R |
| 7,976,283 | B2 | * | 7/2011  | Huck | 416/228 |
| 8,342,920 | B2 | * | 1/2013  | Tanner et al. | 454/71 |
| 2001/0032907 | A1 | * | 10/2001 | Borchers et al. | 244/123 |
| 2008/0041062 | A1 | * | 2/2008  | Au et al. | 60/770 |
| 2008/0047273 | A1 | * | 2/2008  | Au et al. | 60/770 |
| 2010/0096503 | A1 | * | 4/2010  | Tanner et al. | 244/129.4 |
| 2010/0291852 | A1 |   | 11/2010 | Steinert et al. |   |
| 2011/0033307 | A1 | * | 2/2011  | Teraoka et al. | 416/228 |

(Continued)

*Primary Examiner* — Eric Keasel
*Assistant Examiner* — Minh Le
(74) *Attorney, Agent, or Firm* — Ingrassia Fisher & Lorenz, P.C.

(57) ABSTRACT

An aircraft cabin pressure control system outflow valve includes a frame, a valve element, and a vortex generator structure. The vortex generator structure is coupled to the valve element and is rotatable therewith, and includes a plurality of first vortex generators and a plurality of second vortex generators. The first vortex generators spaced are apart from each other and are configured to generate first vortices when the valve element is in an open position and fluid flows through the flow passage. The second vortex generators are formed in each of the first vortex generators and are spaced apart from each other. The second vortex generators are each configured to generate second vortices, which are smaller than the first vortices, when the valve element is in an open position and fluid flows through the flow passage.

11 Claims, 6 Drawing Sheets

(56) References Cited

U.S. PATENT DOCUMENTS

| | | | |
|---|---|---|---|
| 2011/0142635 A1* | 6/2011 | Fritz | 416/62 |
| 2011/0177770 A1 | 7/2011 | Tanner et al. | |
| 2012/0064813 A1* | 3/2012 | Horner et al. | 454/71 |
| 2013/0266441 A1* | 10/2013 | Enevoldsen | 416/1 |

\* cited by examiner

US 8,840,451 B2

CABIN PRESSURE OUTFLOW VALVE WITH SIMPLIFIED WHISTLE ELIMINATOR

TECHNICAL FIELD

The present invention relates generally to aircraft systems and, more particularly, to aircraft cabin pressure control system outflow valves with simplified whistle eliminator.

BACKGROUND

Aircraft are commonly equipped with Cabin Pressure Control Systems (CPCSs), which maintain cabin air pressure within a desired range to increase passenger comfort during flight. A typical CPCS may include a controller, an actuator, and an outflow valve. The outflow valve is typically mounted on a bulkhead of the aircraft or on the outer skin surface of the aircraft, and selectively fluidly couples the aircraft cabin and the atmosphere outside of the aircraft. During operation, the controller commands the actuator to move the outflow valve to various positions to control the rate at which pressurized air is transferred between the aircraft cabin and the outside atmosphere, to thereby control the pressure and/or rate of change of pressure within the aircraft cabin. The controller may be configured to command the actuator to modulate the outflow valve in accordance with a predetermined schedule or as a function of one or more operational criteria. For example, the CPCS may additionally include one or more cabin pressure sensors to sense cabin pressure and supply pressure signals representative thereof to the controller. By actively modulating the outflow valve, the controller may maintain aircraft cabin pressure and/or aircraft cabin pressure rate of change within a desired range.

In some aircraft, the outflow valve may be positioned on the aircraft outer skin surface such that when pressurized air is exhausted from the cabin, the exhausted air may provide additional forward thrust to the aircraft. Thus, outflow valves may sometimes be referred to as thrust recovery valves. Modern thrust recovery valves often contain two valve door elements to optimize the forward thrust that is created. Because of the pressure difference between the pressurized aircraft cabin and the outside atmosphere, and because of the potential energy of the pressurized air in the aircraft cabin, some thrust recovery valves have a rather distinctive shape. This shape accelerates the air as it passes between the thrust recovery valve door elements to provide a net aft thrust force.

Although outflow valves, such as the one described above, are generally safe, reliable, and robust, these valves do exhibit certain drawbacks. For example, many outflow valves may be prone to noise generation, such as a "whistle," especially at aircraft altitudes where the outflow valve may be near a closed position, but not in a sonic airflow regime. This noise can be irritating to aircraft passengers. Presently, such noise elimination is addressed by empirically adding several rows of variously sized vortex generators to various portions of the outflow valve. This, however, can increase overall valve complexity, weight, and cost.

Hence, there is a need for a cabin pressure outflow valve that eliminates irritating noise generation throughout aircraft altitude variations, without introducing unwarranted complexity, weight, and cost. The present invention addresses at least this need.

BRIEF SUMMARY

In one embodiment, and by way of example only, an aircraft cabin pressure control system outflow valve includes a frame, a valve element, and a vortex generator structure. The frame is configured to be mounted on an aircraft, and has an inner surface that defines a flow passage. The valve element is disposed within the flow passage and is rotationally coupled to the frame. The valve element is adapted to receive an actuator output drive torque and is configured, in response thereto, to rotate between a closed position and a plurality of open positions. The vortex generator structure is coupled to the valve element and is rotatable therewith. The vortex generator structure includes a plurality of first vortex generators and a plurality of second vortex generators. The first vortex generators spaced are apart from each other and are configured to generate first vortices when the valve element is in an open position and fluid flows through the flow passage. The second vortex generators are formed in each of the first vortex generators and are spaced apart from each other. The second vortex generators are each configured to generate second vortices, which are smaller than the first vortices, when the valve element is in an open position and fluid flows through the flow passage.

In another exemplary embodiment, an aircraft cabin pressure control system outflow valve includes a frame, an aft valve door, a forward valve door, and a vortex generator structure. The frame is configured to be mounted on an aircraft, and has an inner surface that defines a flow passage. The aft valve door is disposed within the flow passage and is rotationally coupled to the frame. The aft valve door is adapted to receive an actuator output drive torque and is configured, in response thereto, to rotate between a closed position and a plurality of open positions. The forward valve door is disposed within the flow passage and is rotationally coupled to the frame. The forward valve door is adapted to receive the actuator output drive torque and is configured, in response thereto, to rotate, simultaneously with the aft valve door, between a closed position and a plurality of open positions. The vortex generator structure is coupled to the forward valve door and is rotatable therewith. The vortex generator structure includes a plurality of first vortex generators and a plurality of second vortex generators. The first vortex generators are spaced apart from each other and are configured to generate first vortices when the forward and aft valve doors are in an open position and fluid flows through the flow passage. The second vortex generators are formed in each of the first vortex generators and are spaced apart from each other. The second vortex generators are each configured to generate second vortices, which are smaller than the first vortices, when the forward and aft valve doors are in an open position and fluid flows through the flow passage.

Other desirable features and characteristics of the cabin pressure control system outflow valve will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
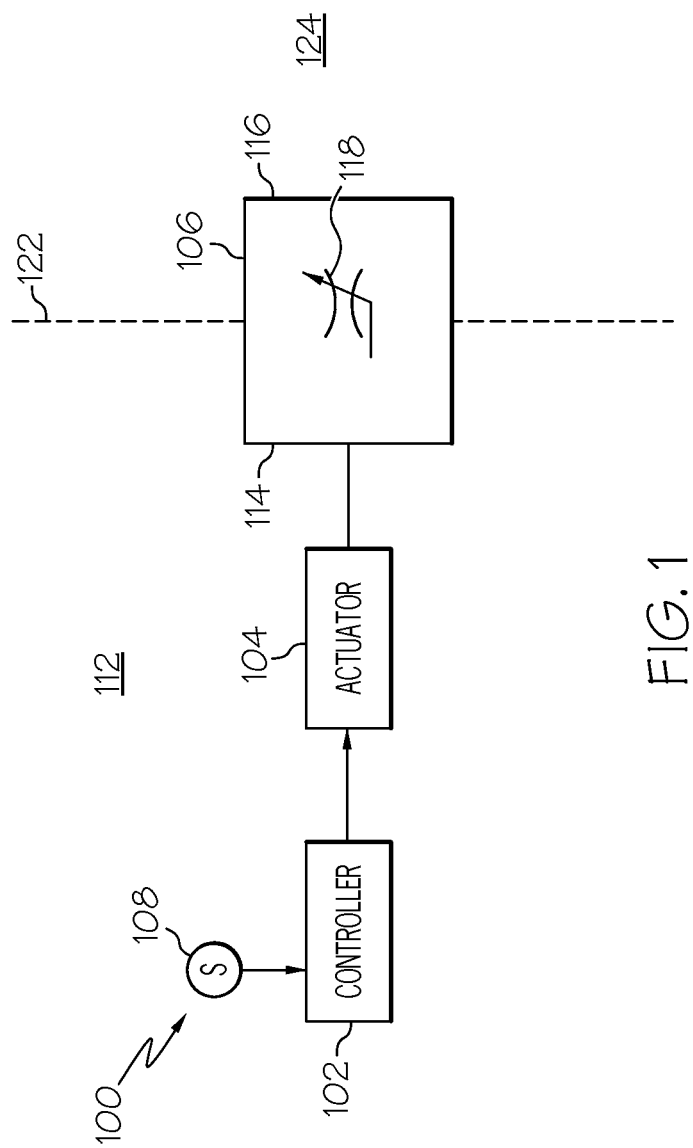
FIG. 1 is a functional block diagram of an exemplary cabin pressure control system (CPCS)

Turning first to FIG. 1, a simplified block diagram of an exemplary aircraft cabin pressure control system (CPCS) 100 is depicted. In the depicted embodiment, the CPCS includes a controller 102, an actuator 104, and an outflow valve 106. The controller 102 is operatively (e.g., electrically) coupled to the actuator 104, which is, in turn, mechanically coupled to the outflow valve 106. During operation of the CPCS 100, the controller 102 commands the actuator 104 to move the outflow valve 106 to various positions, to thereby modulate cabin pressure and/or cabin pressure rate-of-change.

It will be appreciated that the controller 102 may command the actuator 104 to move the outflow valve 106 in accordance with a predetermined schedule or as a function of one or more sensed parameters. In the depicted embodiment, the CPCS 100 further includes one or more cabin pressure sensors 108 (only one shown for clarity) that sense pressure within the aircraft cabin 112 and supply a cabin pressure sensor signal representative thereof to the controller 102. It will additionally be appreciated that the CPCS 100 may be implemented with various other sensors, such as one or more non-illustrated cabin temperature sensors, one or more non-illustrated cabin-to-atmosphere differential pressure sensors, one or more non-illustrated atmospheric temperature sensors, and one or more outflow valve position sensors, just to name a few.

Figure 2:
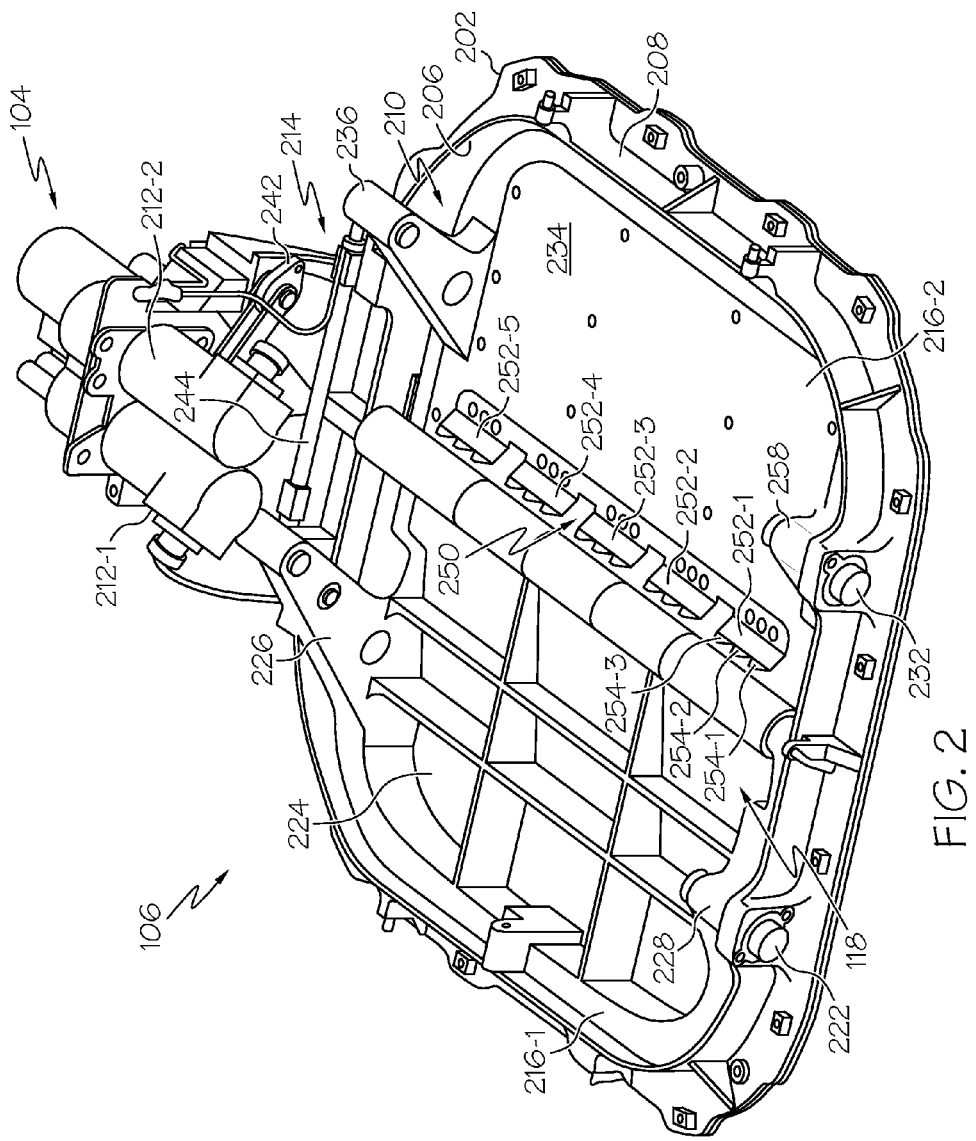
FIG. 2 is an isometric view of an exemplary embodiment of an outflow thrust recovery valve that may be used to implement the exemplary CPCS shown in FIG. 1.

The outflow valve 106 includes an inlet flow port 114, an outlet flow port 116, and an interposed valve element 118. The outflow valve 106 is, for example, mounted on the aircraft exterior skin or pressure bulkhead 122 such that the inlet flow port 114 is exposed to the aircraft cabin 112 and the outlet flow port 116 is exposed to the atmosphere outside of the aircraft 124. Thus, during flight the pressure in the aircraft cabin 112 (e.g., cabin altitude) and/or the rate of change of aircraft cabin altitude, can be controlled by positioning the valve element 118, via the actuator 104. In one specific implementation, the outflow valve 106 is located in the rear underbelly of the aircraft proximate the tail. Moreover, in some implementations, the outflow valve 106 may be positioned so that additional forward thrust is supplied to the aircraft when pressurized air is venting from the aircraft cabin 112 to the atmosphere 124 outside the aircraft. It will be appreciated that the outflow valve 106 may be variously configured to implement this functionality. One particular physical implementation is depicted in FIG. 2, and with reference thereto will now be described.

The exemplary physical implementation of the outflow valve 106 includes a frame 202, the valve element 118, and the actuator 104. The frame 202 is configured to be mounted on the aircraft exterior skin or pressure bulkhead 122, and includes an inner surface 206 and an outer surface 208. The inner surface 206 defines a flow passage 210 through the frame, between the inlet flow port 114 and the outlet flow port 116. The valve element 118 is rotationally coupled to the frame 202, and is coupled to receive an actuation drive force from the actuator 104. In the depicted embodiment, the actuator 104 is mounted on the outflow valve 106, and is more particularly coupled to the outer surface 208 of the frame 202. Although the actuator 104 may be variously configured and implemented, in the depicted embodiment, the actuator 104 is implemented using a plurality of electrical motors 212 (e.g., 212-1, 212-2) and actuation hardware 214. The motors 212 are each adapted to receive actuation commands from the controller 102 (not shown in FIG. 2) and are each operable, upon receipt thereof, to supply a drive torque. The actuation hardware 214 is coupled between each of the motors 212 and the valve element 118, and receives the drive torque from one or both of the motors 212. The actuation hardware 214, upon receipt of the drive torque from one or both of the motors 212, supplies the actuation drive force to the valve element 118.

The valve element 118, in response to the actuation drive force it receives from the actuation hardware 214, rotates to a position between a closed position and a plurality of open positions. It is noted that the position of the valve element 118 during flight is typically a partially open position, intermediate the fully closed position and fully open position. Although the valve element 118 may be variously configured and implemented, in the depicted embodiment the valve element is implemented using two valve doors 216—a first valve door 216-1 and a second valve door 216-2—that are each rotationally coupled to the frame 202.

Before proceeding further, it was noted above that in some embodiments the outflow valve 106 may be located in the rear underbelly of the aircraft proximate the tail. Moreover, and as shown via airflow arrow 218 in FIG. 2, the outflow valve 106 is preferably mounted such that second valve door 216-2 is closer to the front of the aircraft than the first valve door 216-1. For this reason, the first valve door 216-1 and second valve door 216-2 may also be referred to herein as the aft valve door 216-1 and the forward valve door 216-2, respectively.

Returning once again to the description, and with continued reference to FIG. 2, it may be seen that the aft valve door 216-1 is rotationally coupled to the frame 202 via a plurality of first bearings 222 (only one visible), and includes a main body 224 and first and second arms 226 and 228. The forward valve door 216-2 is rotationally coupled to the frame 202 via a plurality of second bearings 232 (only one visible), and also includes a main body 234 and first and second arms 236 and 238. The first arm 226 of the aft valve door 216-1 is coupled to the actuator 104 via a master link 242, and is further coupled to the first arm of the forward valve door 216-2 via a slave link 244. Though not depicted in FIG. 2, it will be appreciated that in some embodiments, the second arms 228 and 238 may also be coupled together via a second slave link. In either case, the master link 242 and slave link 244, which at least partially comprise the actuation hardware 214, enable the actuator 104 to simultaneously move the aft and forward valve doors 216 between the closed position, which is the position depicted in FIG. 3, and a plurality of open (or cruise) positions, one of which is depicted in FIG. 4.

Figure 3:
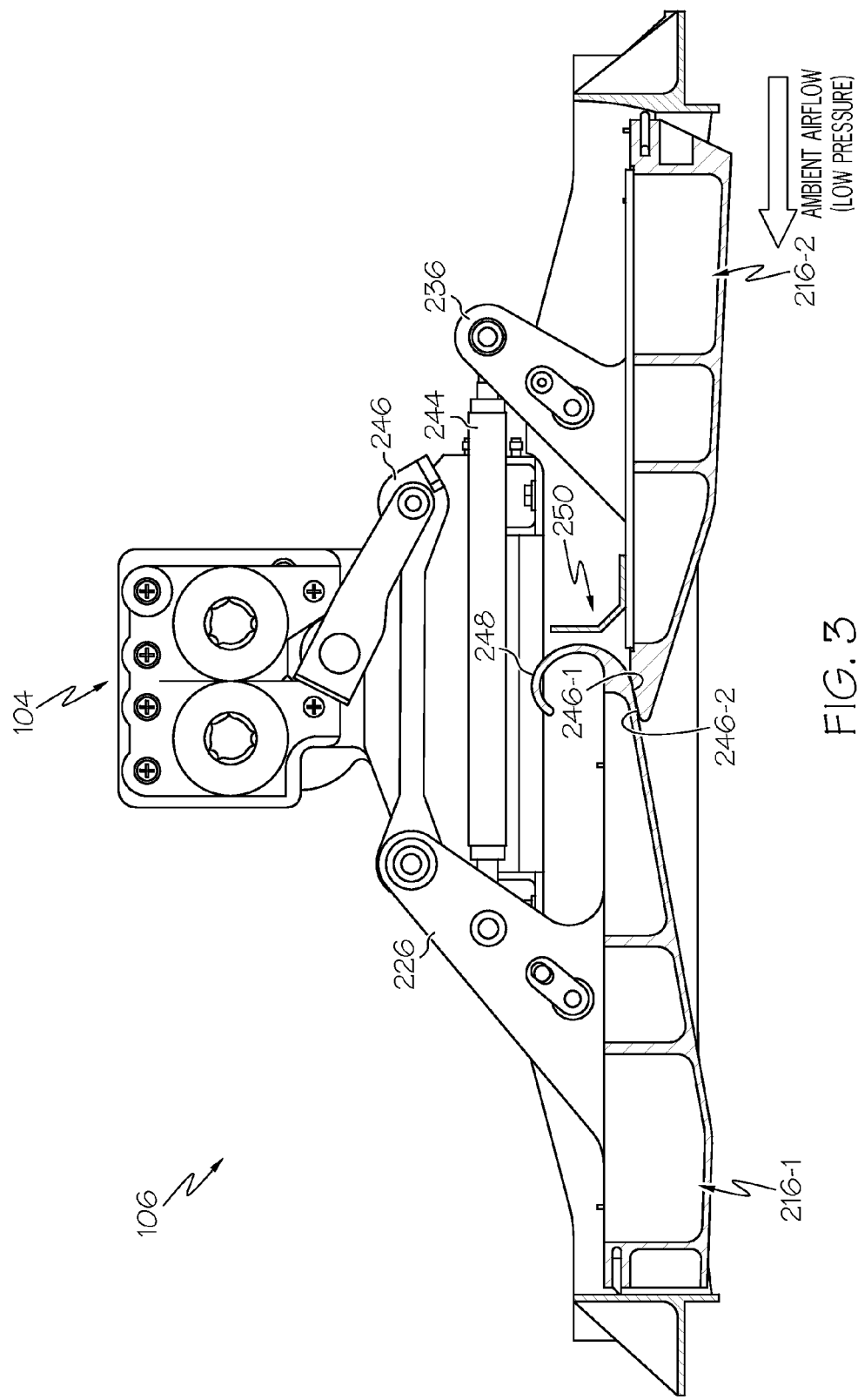
FIGS. 3 and 4 are cross section views of the exemplary outflow valve taken along line 3-3 in FIG. 2, and with the valve in the closed position and an open position, respectively.
Figure 4:
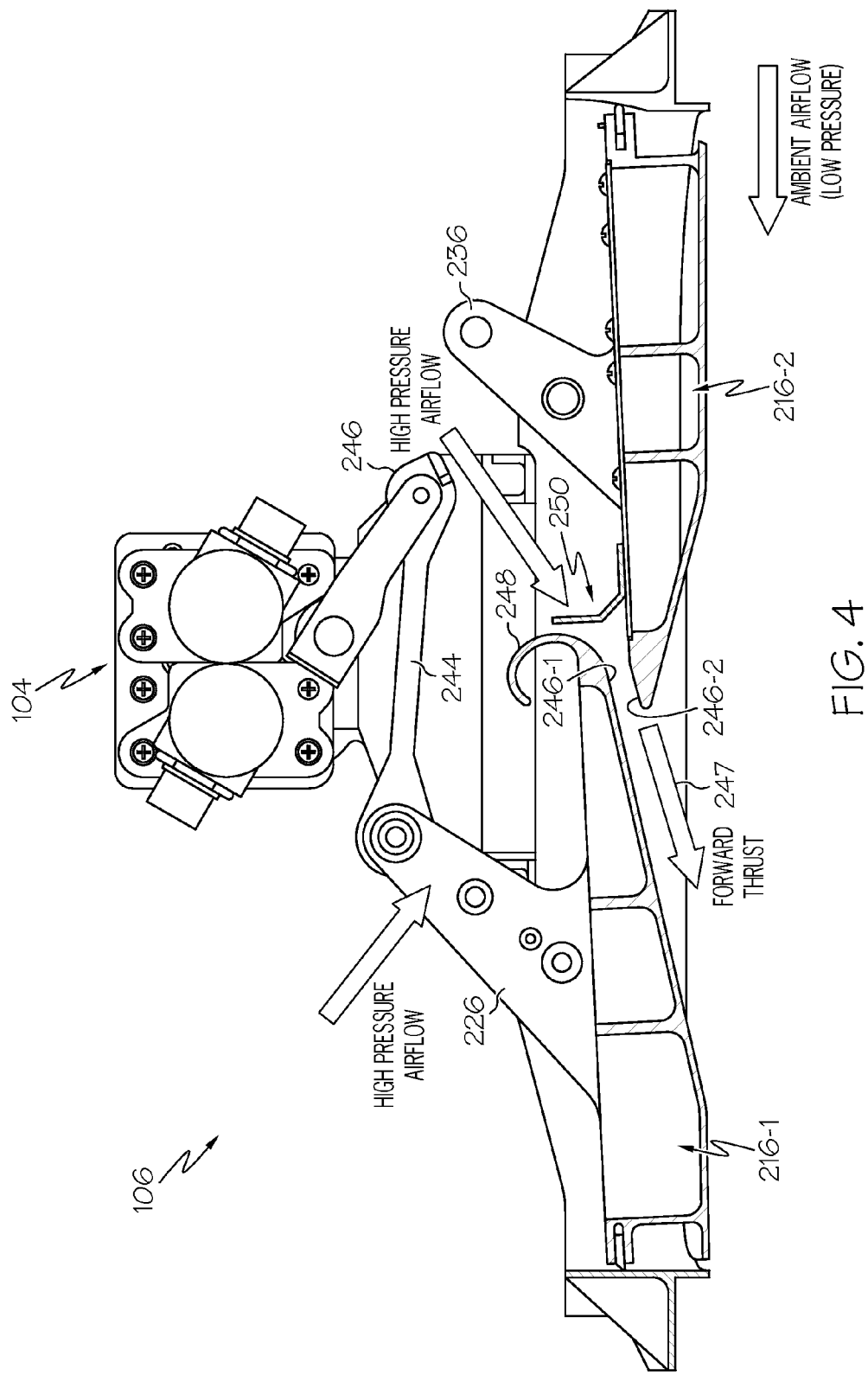

With reference now to FIG. 3, it is seen that when the valve element 118 is in the closed position, the aft valve door 216-1 and the forward valve door 216-2 engage each other at, what are referred to herein as, inner sealing edges. That is, the aft valve door 216-1 has an inner sealing edge 246-1 that engages an inner sealing edge 246-2 of the forward valve door 216-2 when the valve element 118 (e.g., the aft and forward valve doors 216) is in the closed positions. Conversely, as depicted in FIG. 4, when the valve element 118 is moved to an open position, the inner sealing edges 246 disengage, allowing pressurized air to flow from the aircraft cabin 112, through the aft and forward valve doors 216, to the outside atmosphere.

The outflow valve 104 is preferably configured such that, when the valve element 118 is in an open position, pressurized air flow through the forward and aft valve doors 216 occurs in a relatively smooth and relatively quiet manner. Moreover, when implemented as a thrust recovery valve, the outflow valve 104 preferably encourages rapid air flow therethrough to optimize thrust output (represented by arrow 247 in FIG. 4). To promote relatively smooth air flow through the outflow valve 104, the aft valve door 216-1, at least in the depicted embodiment, may additionally include a bellmouth 248. The bellmouth 248, if included, comprises a generally curved wall that is fixedly coupled to, or integrally formed with, the main body 224 of the aft valve door 216-1 proximate its inner sealing edge 246-1.

To promote relatively quiet air flow, the outflow valve 104 additionally includes a vortex generator structure 250. The vortex generator structure 250 is coupled to the forward valve door 216-2 proximate its inner sealing edge 246-2, and includes a plurality of first vortex generators 252 and a plurality of second vortex generators 254. It will be appreciated that the vortex generator structure 250 may also, in alternative embodiments, be coupled to the aft valve door 216-1 on, or at least proximate, the bellmouth 248.

In the depicted embodiment, the vortex generator structure 250 includes five first vortex generators (e.g., 252-1, 252-2, 252-3, 252-4, 252-5). It will be appreciated, however, that the vortex generator structure 250 could be implemented, as needed or desired, with more or less than this number of first vortex generators 252. Moreover, the specific shape and spacing could be different. For example, in some embodiments the first vortex generators 252 could be non-equally spaced apart.

Figure 5:
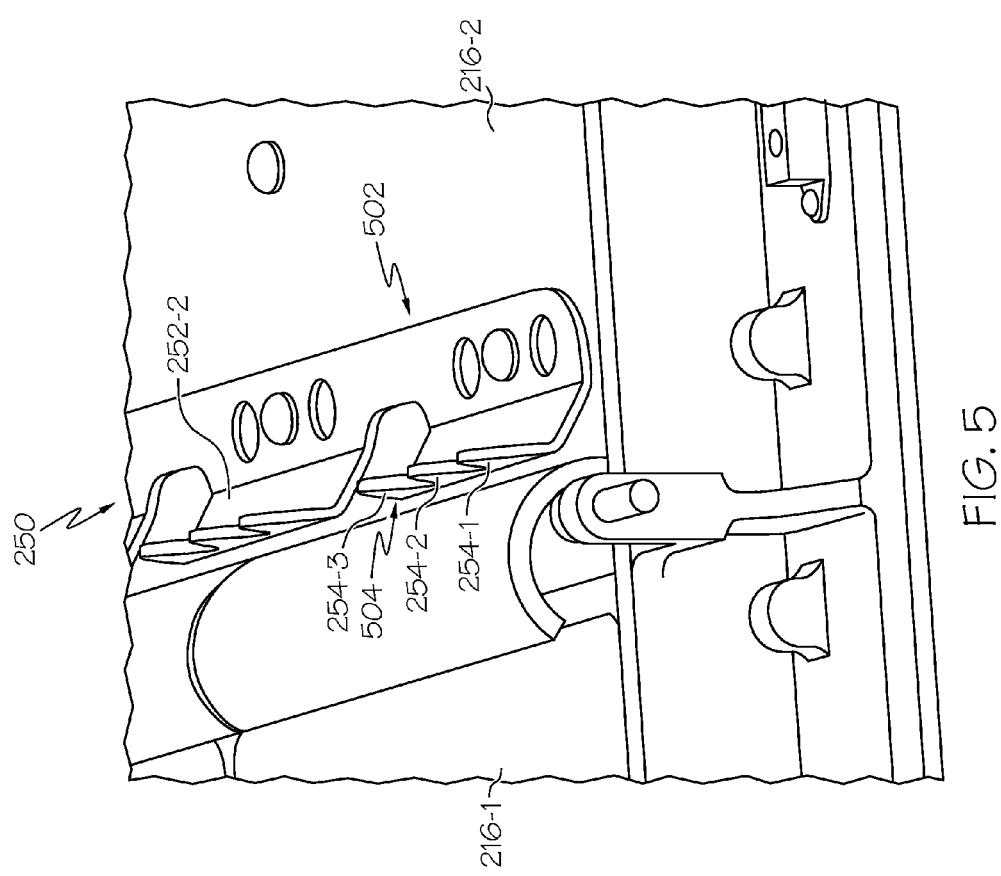
FIGS. 5 and 6 are close-up views of the exemplary outflow valve of FIG. 2, depicting more clearly an embodiment of a vortex generator structure used to implement the outflow valve.
Figure 6:
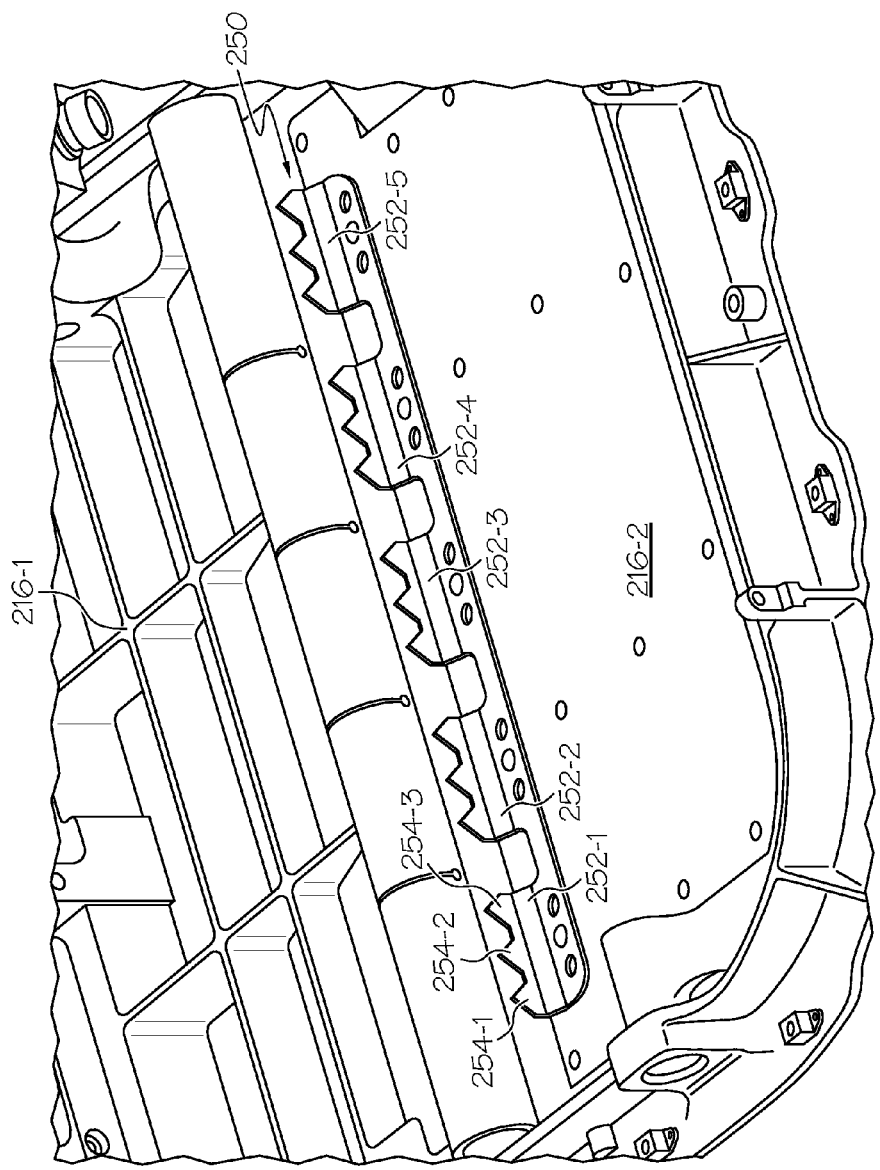

No matter the specific number of first vortex generators 252, each is spaced apart from each other, each has a first cross sectional area, and each is configured to generate first, relatively large, vortices when the valve element 118 is in an open position and air flows through the outflow valve 104. Although the first vortex generators 252 may be variously implemented, in the depicted embodiment, as shown most clearly in FIGS. 5 and 6, each includes a fixed end 502 and a free end 504. The fixed end 502 of each first vortex generator 252 is coupled to the forward valve door 216-2 and to each of the other fixed ends 502. The free end 504 of each first vortex generator 252 extends away from the forward valve door 216-2, and has a plurality of the second vortex generators 254 formed therein.

The second vortex generators 254 are formed in each of the first vortex generators 252, and more specifically in the free ends 504 of the first vortex generators 252. In the depicted embodiment, three second vortex generators 254 (e.g., 254-1, 254-2, 254-3) are formed in each first vortex generator 252. However, as with the first vortex generators 252, it will be appreciated that the vortex generator structure 250 could be implemented, as needed or desired, with more or less than this number of second vortex generators 254.

No matter the specific number of second vortex generators 254, each is also spaced apart from each other, each has a second cross sectional area, and each is configured to generate second vortices when the valve element 118 is in an open position and air flows through the outflow valve 104. As may be readily apparent from FIGS. 2, 5, and 6, the second cross sectional area is less than the first cross sectional area and, concomitantly, the second vortices generated by the second vortex generators 254 are smaller than the first vortices generated by the first vortex generators 252. The second vortex generators 254 may be variously implemented, but in the depicted embodiment, as shown most clearly in FIGS. 5 and 6, each comprises a generally triangular shaped tooth that is formed in, and extends from, the free end 504 of a first vortex generator 252. It will be appreciated, however, that the second vortex generators 254 could be implemented using any one of numerous other cross sectional shapes, not just triangular. Moreover, in some embodiments, the second vortex generators 254 may not have identical cross sectional shapes.

The vortex generator structure 250 disclosed herein is effective at various aircraft altitudes. Thus, the vortex generator structure 250 may replace presently known structures that include multiple rows, multiple sizes, and multiple shapes of vortex generators that are disposed on various portions of the outflow valve. This leads to significant reduction in outflow valve complexity, weight, and cost.

While described above in the context of an exemplary cabin pressure control system, it should be appreciated that embodiments of the outflow valve may be utilized in various other avionic and non-avionic applications where it is desirable to eliminate unwanted and/or undesirable flow noise. Furthermore, although the above-described exemplary outflow valve employed two (i.e., forward and aft) rotatable doors, alternative embodiments of the outflow valve may include any suitable number of rotatable doors or other such valve elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft cabin pressure control system outflow valve, comprising:
   a frame configured to be mounted on an aircraft, and having an inner surface that defines a flow passage through the frame;
   a valve element disposed within the flow passage and rotationally coupled to the frame, the valve element adapted to receive an actuator output drive torque and configured, in response thereto, to rotate between a closed position and a plurality of open positions; and
   a vortex generator structure coupled to the valve element and rotatable therewith, the vortex generator structure comprising:
      a plurality of first vortex generators, the first vortex generators spaced apart from each other and configured to generate first vortices when the valve element is in an open position and fluid flows through the flow passage, and
      a plurality of second vortex generators formed in each of the first vortex generators and spaced apart from each other, the second vortex generators each configured to generate second vortices, which are smaller than the first vortices, when the valve element is in an open position and fluid flows through the flow passage.

2. The outflow valve of claim 1, wherein:
each of the first vortex generators has a first cross sectional area; and
each of the second vortex generators has a second cross sectional area that is smaller than the first cross sectional area.

3. The outflow valve of claim 2, wherein:
each of the first vortex generators comprises a fixed end and a free end;
the fixed end of each of the first vortex generators are coupled to the valve element and to each other;
the free end of each of the first vortex generators extend from the valve element; and
each of the second vortex generators is formed a free end of a first vortex generator.

4. The outflow valve of claim 1, wherein:
the valve element comprises an aft door and a forward door, each door disposed within the flow passage, rotationally coupled to the frame, and responsive to the actuation drive force to rotate to a position between a closed position and a plurality of open positions; and
the vortex generator structure is coupled to the forward door.

5. The outflow valve of claim 1, further comprising:
an actuator coupled between the frame and the valve element, the actuator adapted to receive actuation commands and operable, in response thereto, to supply the actuator output drive torque to the valve element.

6. The outflow valve of claim 5, wherein the actuator comprises a plurality of motors, each motor adapted to receive actuation commands and operable, upon receipt thereof, to supply a drive torque.

7. An aircraft cabin pressure control system outflow valve, comprising:
a frame configured to be mounted on an aircraft and having an inner surface that defines a flow passage through the frame;
an aft valve door disposed within the flow passage and rotationally coupled to the frame, the aft valve door adapted to receive an actuator output drive torque and configured, in response thereto, to rotate between a closed position and a plurality of open positions;
a forward valve door disposed within the flow passage and rotationally coupled to the frame, the forward valve door adapted to receive the actuator output drive torque and configured, in response thereto, to rotate, simultaneously with the aft valve door, between a closed position and a plurality of open positions; and
a vortex generator structure coupled to the forward valve door and rotatable therewith, the vortex generator structure comprising:
a plurality of first vortex generators, the first vortex generators spaced apart from each other and configured to generate first vortices when the forward and aft valve doors are in an open position and fluid flows through the flow passage, and
a plurality of second vortex generators formed in each of the first vortex generators and spaced apart from each other, the second vortex generators each configured to generate second vortices, which are smaller than the first vortices, when the forward and aft valve doors are in an open position and fluid flows through the flow passage.

8. The outflow valve of claim 7, wherein:
each of the first vortex generators has a first cross sectional area; and
each of the second vortex generators has a second cross sectional area that is smaller than the first cross sectional area.

9. The outflow valve of claim 8, wherein:
each of the first vortex generators comprises a fixed end and a free end;
the fixed end of each of the first vortex generators are coupled to the valve element and to each other;
the free end of each of the first vortex generators extend from the valve element; and
each of the second vortex generators is formed a free end of a first vortex generator.

10. The outflow valve of claim 7, further comprising:
an actuator coupled between the frame and the valve element, the actuator adapted to receive actuation commands and operable, in response thereto, to supply the actuator output drive torque to the valve element.

11. The outflow valve of claim 10, wherein the actuator comprises a plurality of motors, each motor adapted to receive actuation commands and operable, upon receipt thereof, to supply a drive torque.

* * * * *